(12) United States Patent
Nace et al.

(10) Patent No.: US 11,806,857 B2
(45) Date of Patent: Nov. 7, 2023

(54) AIRFLOW INTAKE CONFIGURATION IN POWER TOOL

(71) Applicant: Black & Decker Inc., New Britain, CT (US)

(72) Inventors: Daniel F. Nace, Towson, MD (US); James H. Stiles, III, Baltimore, MD (US)

(73) Assignee: BLACK & DECKER, INC., New Britain, CT (US)

(*) Notice: Subject to any disclaimer, the term of this patent is extended or adjusted under 35 U.S.C. 154(b) by 81 days.

(21) Appl. No.: 17/412,459

(22) Filed: Aug. 26, 2021

(65) Prior Publication Data

US 2022/0063080 A1 Mar. 3, 2022

Related U.S. Application Data

(60) Provisional application No. 63/071,416, filed on Aug. 28, 2020.

(51) Int. Cl.
*B25F 5/00* (2006.01)
*B24B 23/02* (2006.01)
(Continued)

(52) U.S. Cl.
CPC ............ *B25F 5/008* (2013.01); *B24B 23/022* (2013.01); *B25F 5/001* (2013.01); *H02K 5/20* (2013.01);
(Continued)

(58) Field of Classification Search
CPC ............ H02K 5/20; H02K 5/207; H02K 7/14; H02K 7/145; H02K 9/06; B24B 23/028; B25F 5/008
See application file for complete search history.

(56) References Cited

U.S. PATENT DOCUMENTS

| 3,912,411 A | 10/1975 | Moffat |
| 4,637,170 A | 1/1987 | Block |

(Continued)

FOREIGN PATENT DOCUMENTS

| DE | 3012836 C2 | 9/1985 |
| DE | 8414271 U1 | 9/1985 |

(Continued)

OTHER PUBLICATIONS

EP EESR, dated Feb. 1, 2022 in corresponding EP application 21193316.3.

(Continued)

*Primary Examiner* — Eric Johnson (57) ABSTRACT

A power tool is provided including a housing including a motor case and a handle; an electric motor housed within the motor case and rotatably driving a motor spindle; a gear case mounted on the housing; and an output spindle rotatably coupled to the motor spindle. The output spindle, motor spindle, and the handle form the plane through the housing. A fan is coupled to the motor to generate an airflow through the housing. The housing includes a first air inlet on a first side of the plane and a second air inlet a second side of the plane opposite the first air inlet, both adjacent the motor. The first air inlet is larger than the second air inlet to allow a larger volume of air to enter the housing from the first side of the plane than from the second side of the plane.

20 Claims, 9 Drawing Sheets

(51) Int. Cl.
  *H02K 5/20* (2006.01)
  *H02K 9/06* (2006.01)
  *F16F 1/32* (2006.01)

(52) U.S. Cl.
  CPC .............. *H02K 9/06* (2013.01); *B24B 23/028* (2013.01); *F16F 1/32* (2013.01)

(56) References Cited

U.S. PATENT DOCUMENTS

| | | | |
|---|---|---|---|
| 4,980,994 A | 1/1991 | Helm et al. | |
| 5,464,365 A | 11/1995 | Kirn | |
| 5,545,078 A | 8/1996 | Schulz et al. | |
| 7,192,338 B2 | 3/2007 | Kausch et al. | |
| 8,573,324 B2 | 11/2013 | Turner et al. | |
| 8,776,657 B2 | 7/2014 | Menze | |
| 9,033,767 B2 | 5/2015 | Schadow | |
| 9,073,127 B2 | 7/2015 | Esenwein | |
| 9,399,278 B2 | 7/2016 | Kuether | |
| 2006/0181159 A1 | 8/2006 | Dehde | |
| 2011/0179931 A1 | 7/2011 | Menze | |
| 2012/0302147 A1* | 11/2012 | Trautner | B24B 41/007 451/488 |
| 2014/0080387 A1 | 3/2014 | Kuether | |
| 2015/0111480 A1 | 4/2015 | Vanko et al. | |
| 2017/0234484 A1 | 8/2017 | Vanko et al. | |
| 2017/0361416 A1* | 12/2017 | Lutz | B25F 5/008 |
| 2019/0262753 A1 | 8/2019 | Miura et al. | |
| 2020/0331138 A1* | 10/2020 | Ejiri | B25F 5/008 |

FOREIGN PATENT DOCUMENTS

| | | | |
|---|---|---|---|
| DE | 3613987 A1 | 10/1987 | |
| DE | 3731026 A1 | 3/1989 | |
| DE | 3742430 A1 | 6/1989 | |
| DE | 3731026 C2 | 3/1990 | |
| DE | 3917345 A1 | 11/1990 | |
| DE | 199 38 299 A1 | 3/2001 | |
| DE | 102004013014 A1 | 10/2005 | |
| DE | 102006001986 A1 | 7/2007 | |
| DE | 102008015955 A1 | 8/2009 | |
| DE | 202014009916 U1 | 2/2015 | |
| DE | 102005047402 B4 | 2/2016 | |
| DE | 202018106210 U1 | 12/2018 | |
| EP | 1371450 A1 | 12/2003 | |
| EP | 1398865 A2 | 3/2004 | |
| EP | 1343614 B1 | 10/2004 | |
| EP | 1728592 A2 | 12/2006 | |
| EP | 1663574 B1 | 4/2007 | |
| EP | 1597023 B1 | 10/2008 | |
| EP | 1763419 B1 | 10/2009 | |
| EP | 2502704 A1 | 9/2012 | |
| EP | 2214866 B1 | 6/2013 | |
| EP | 2632636 B1 | 1/2015 | |
| EP | 2946887 A1 | 11/2015 | |
| EP | 3109001 B1 | 5/2019 | |
| EP | 3507517 A1 | 7/2019 | |
| EP | 3733347 A1 | 11/2020 | |
| JP | 58049066 | 3/1983 | |
| JP | 2010036260 A | 2/2010 | |
| WO | 2005039822 A1 | 5/2005 | |
| WO | 2012/126997 A1 | 9/2012 | |
| WO | WO-2019130981 A1 * | 7/2019 | ............. B24B 23/02 |

OTHER PUBLICATIONS

EP EESR, dated Dec. 20, 2021 in corresponding EP application 21193291.8.

* cited by examiner

FIG. 11

AIRFLOW INTAKE CONFIGURATION IN POWER TOOL

RELATED APPLICATION

This patent application claims the benefit of U.S. Provisional Patent Application No. 63/071,416 filed Aug. 28, 2020 titled "POWER TOOL," which is incorporated herein by reference in its entirety.

FIELD OF THE DISCLOSURE

This disclosure relates to power tools and in particular to grinding power tools.

BACKGROUND

Motorized power tools including grinders require a cooling fan to cool the motor and electronics components that control flow of current to the motor. A series of air intakes and outlets are provided in the tool housing, allowing the fan to generate an airflow for effective cooling of these elements. In some designs, air intakes are provided near the foot of the tool to create a substantially linear airflow path through the power tool.

In applications such as grinders, where high concentration of debris contaminates the air in the vicinity of the power tool, screens or air filters may be provided on air intake vents to filter out the contamination. While screens and filters significantly improve air quality of the airflow, small amounts of leakage dust and debris is often inevitable. What is needed is a mechanism that optimizes the airflow to reduce overall amount contamination entering through the air intake vents.

SUMMARY

According to an embodiment of the invention, a power tool is provided including a housing including a motor case and a handle extending from the motor case; an electric motor housed within the motor case and rotatably driving a motor spindle; a gear case mounted on the housing; and an output spindle received at least partially within the gear case and rotatably coupled to the motor spindle. The output spindle is oriented perpendicularly to the motor spindle and together forming a plane through the housing. In an alternative and/or additional embodiment, the output spindle, motor spindle, and the handle form the plane through the housing. The power tool further includes a fan rotatably fixed to the motor spindle to generate an airflow through the electric motor; a first air inlet formed in the housing adjacent the electric motor on a first side of the plane; and a second air inlet formed in the housing adjacent the electric motor on a second side of the plane opposite the first air inlet. The first air inlet is larger than the second air inlet to allow a larger volume of air to enter the housing from the first side of the plane than from the second side of the plane.

In an embodiment, the output spindle rotates in a clockwise direction when viewed from a top of the gear case, and the first air inlet is located on the left side of the housing when viewed from the top of the gear case in a normal gripping position.

In an embodiment, the electric motor includes a stator and a rotor disposed within the stator, and the first and second air inlets are positioned around the electric motor such that the air entering through the first and second air inlets traverses along the electric motor in a direction opposite the gear case and is thereafter directed into the electric motor in the direction of the gear case.

In an embodiment, the power tool includes an exhaust vent positioned on the gear case through which the air is existed.

In an embodiment, the fan is positioned between the electric motor and the gear case.

In an embodiment, a width and/or diameter of the first air intake is 80% to 90% greater than a width and/or diameter of the second air intake.

In an embodiment, an area of the second air intake is in the range of approximately 400 to 500 $mm^2$, and an area of the first air intake is in the range of approximately of 600 to 700 $mm^2$.

In an embodiment, the air flows into the housing at an airflow volume of approximately 12 to 14 cubic-feet per minute through the second air inlet, and at an airflow volume of approximately 17 to 19 cubic-feet per minute through the first air inlet.

BRIEF DESCRIPTION OF THE DRAWINGS

The drawings described herein are for illustrative purposes only of selected embodiments and not all possible implementations, and they are not intended to limit the scope of the present disclosure.

Corresponding reference numerals indicate corresponding parts throughout the several figures of the drawings.

DETAILED DESCRIPTION

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 1:
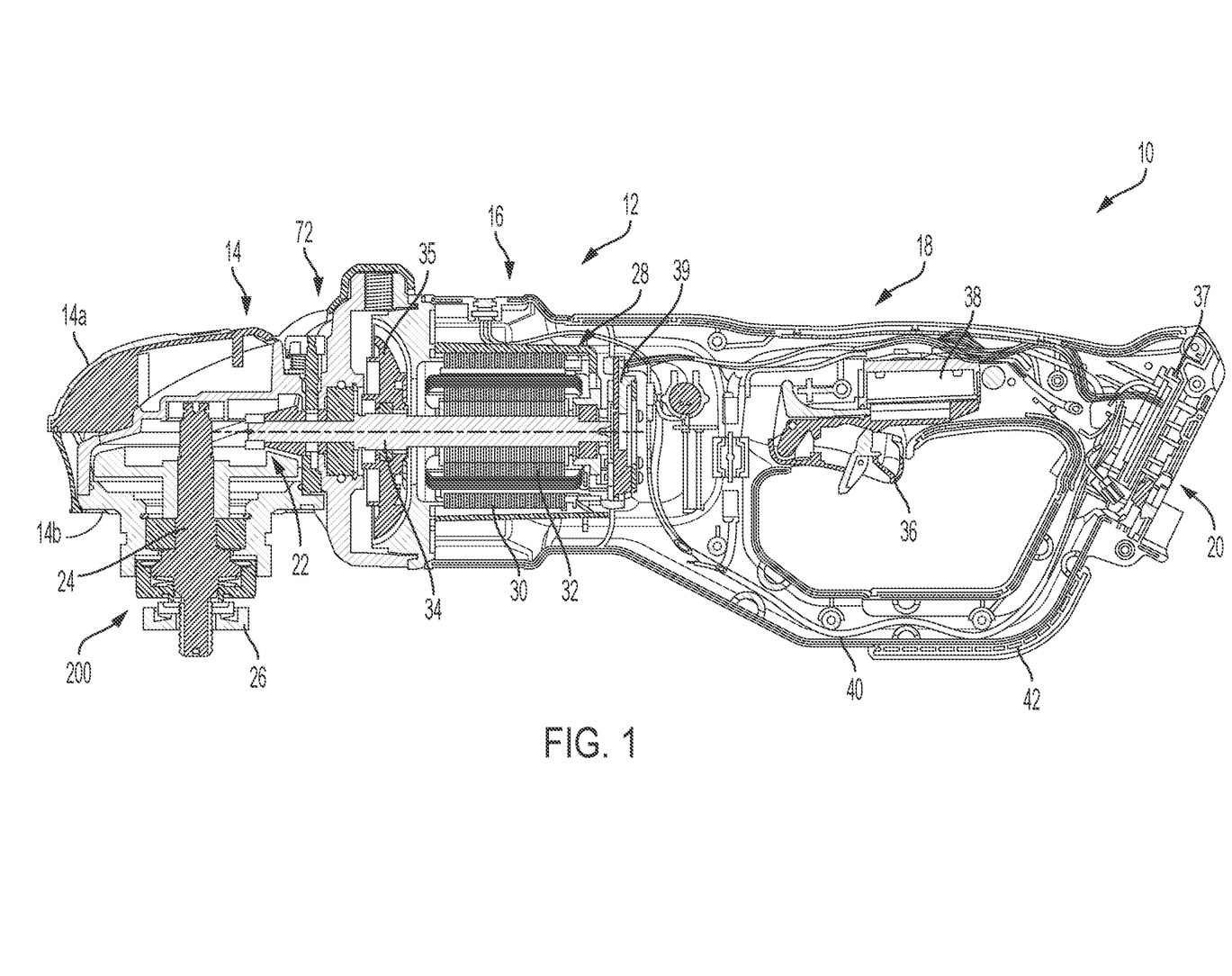
FIG. 1 is a side cross-sectional view of a power tool, according to an embodiment.

FIG. 1 is a side cross-sectional view of a power tool 10, according to an embodiment. In an embodiment, power tool 10 is provided including a housing 12 having a gear case 14, a motor case 16, a handle portion 18, and a battery receiver 20. Power tool 10 as shown herein is an angle grinder with the gear case 14 housing a gearset 22 that drives an output spindle 24 arranged to be coupled to a grinding or cutting disc (not shown, herein referred to as "accessory wheel"), either via threads on the disc, or via a flange (or threaded nut) 26 and guarded by a disc guard (not shown). It should be understood, however, that the teachings of this disclosure may apply to any other power tool including, but not limited to, a saw, drill, sander, and the like. Gearset 22 may include the output spindle 24 at a 90-degree angle orientation or in a linear orientation. In an embodiment, gear case 14 includes an upper gear case cover 14a and a lower gear case cover 14b that cooperatively house the gearset 22 components.

In an embodiment, the motor case 16 attaches to a rear end of the gear case 14 and houses a motor 28 operatively connected to the gear set 22. An intermediary plate or baffle may be disposed between the motor case 16 and the rear end of the gear case 14. In an embodiment, the motor 28 is a brushless direct-current (BLDC) motor having a stator 30 and a rotor 32 rotatable relative to the stator 30. The rotor 32 is mounted on a rotor shaft 34 that rotatably drives the output spindle 24 via the gearset 22. A fan 35 is mounted on the rotor shaft 34 between the motor 28 and the gear case 14, facing the intermediary plate or baffle, to generate an airflow for cooing the motor 28 and other components. The airflow generated by the fan 35 exits through an air exhaust vent 72 provided on the motor case 16 and/or the gear case 14.

In an embodiment, the handle portion 18 extends from a rear end of the motor case 16 and includes a trigger switch 36 operatively connected to a switch assembly 38. The switch assembly 38 is in turn coupled to a control module 37 that includes a programmable controller and controls a switching operation of a power module 39. In an embodiment, the control module 37 is disposed at a rear of the handle portion 18 adjacent the battery receiver 20. The battery receiver 20 is provided at the rear end of the handle portion 18 for detachable engagement with a battery pack (not shown) to provide power to the motor 28.

In an embodiment, a second handle 40 is provided that extends from the rear end of the motor case 16 to the battery receiver 20, at least partially in parallel to the handle portion 18. In an embodiment, second handle 40 is a D-handle designed to enhance structural support for the handle portion 18 and the battery pack and improve drop performance of the power tool 10. In an embodiment, second handle 40 is provided with a bumper 42 arranged to absorb shock during drop or impact. In an embodiment, bumper 42 is made of an overmold material.

In an exemplary embodiment, the battery pack may be a 60-volt max lithium-ion type battery pack, although battery packs with other battery chemistries, shapes, voltage levels, etc. may be used in other embodiments. In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. patent application Ser. No. 14/715,258 filed May 18, 2015, also incorporated by reference, can be used. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

In an embodiment, the power module 39 is disposed at a rear of the motor 28, i.e. between the motor case 16 and the handle portion 18. In an embodiment, power module 39 is a circuit board oriented radially adjacent the end of the motor 28 including a series of Field-Effect Transistors (FETs) interconnected as a multi-phase inverter circuit for powering the phases of the motor 28. In an embodiment, control module 37, switch assembly 38, and power module 39 may be provided discretely or integrated into sub-assemblies.

In an embodiment, the control module 37 uses the input from the trigger assembly 38 to set a target speed for the motor 28. This is done by controlling a pulse-width modulation (PWM) of the power switches within the power module 39. When the trigger switch 36 is released, in an embodiment, the control module 37 activates the low-side switches or the high-side switches of the power module 39 simultaneously for regenerative electronic braking of the motor 28. A description of the power and control modules and electronic braking of the motor can be found in US Patent Publication No. 2017/0234484, filed Feb. 10, 2017, which is incorporated herein by reference in its entirety.

Braking of the motor at high speed, either electronically or via a mechanical brake, causes rapid deceleration of the output spindle 24. Absent a mechanism to retain and protect the accessory wheel, high inertia of the accessory wheel can cause it to detach from the output spindle 24 upon rapid deceleration. For this reason, in some configurations, the nut 26 may be provided with a spring mechanism to apply an upward force on the accessory wheel to increase friction between the accessory disc and an upper flange of the power tool 10. Additionally, and/or alternatively, in some configurations, the power tool 10 may be provided with a wheel retention mechanism configured to apply a downward force on the accessory wheel to similarly increase the friction between the accessory disc and the upper flange of the power tool 10 as well as the friction between the threads of the accessory wheel and the output spindle 24, resulting in an increased accessory unseating torque. This increased friction significantly reduces the likelihood of the accessory wheel coming off the output spindle 24.

Figure 2:
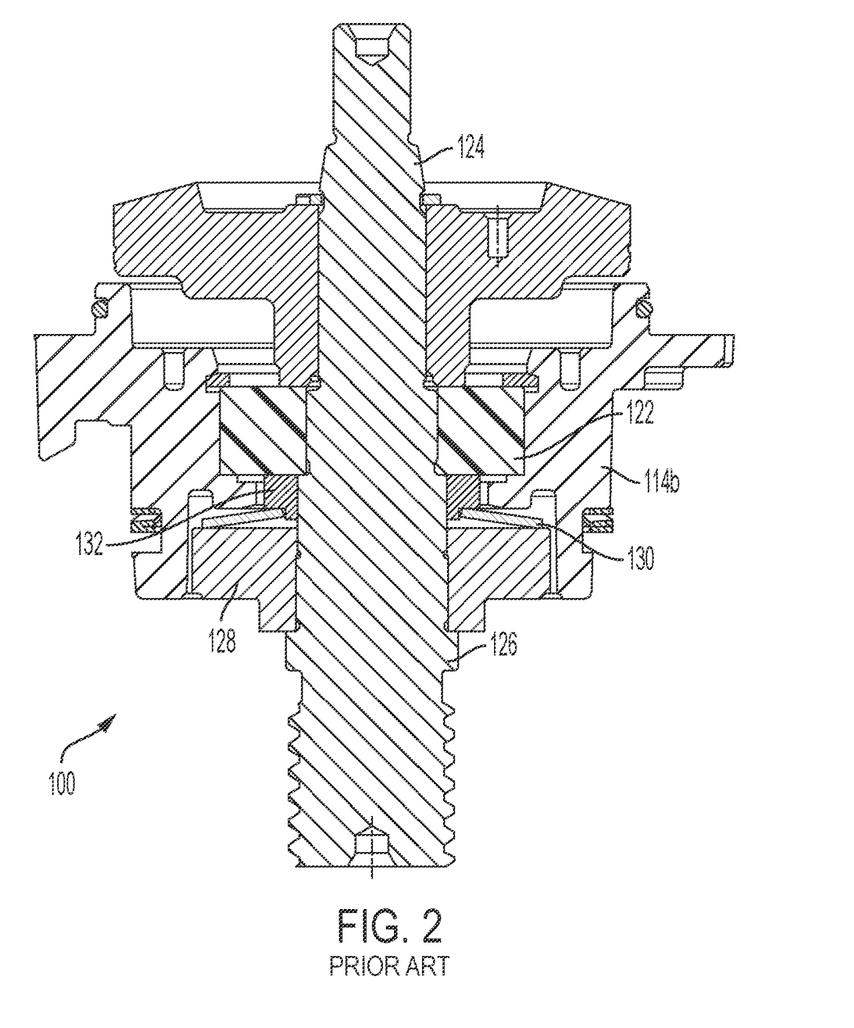
FIG. 2 is a side cross-sectional view of a conventional wheel retention mechanism.

Referring to FIG. 2, a prior art wheel retention mechanism 100 is described. Only the lower gear case cover 114b, output spindle 124, and wheel retention mechanism 100 components are illustrated in this view. In this configuration, output spindle 124 is axially fixed to the lower gear case cover 114b via a bearing 122 and includes a rim 126 disposed at a location below the bearing 122 and below a plane of the lower gear case cover 114b. Wheel retention mechanism 100 includes a transfer member 128 disposed around the output spindle 124 above the rim 126. A spring member 130 (in this example a Belleville disc) is disposed between the transfer member 128 and the bearing 122 (via a spacer 132). A backing flange (not shown) is typically mounted on the lower end of the output spindle 124 in contact with the transfer member 128. When a wheel accessory is mounted on the output spindle 124, the rotational force of the accessory as it is being tightened imparts an upward force on the transfer member 128 through the backing flange, causing the transfer member 128 to move upward relative to the output spindle 124 against the force of the spring member 130. The spring member 130 applies a downward force on the transfer member 128, thus increasing friction between the transfer member 128, the backing flange, and the wheel accessory.

In this configuration, during manufacturing and assembly, the transfer member 128 and spring member 130 are mounted over the rim 126 before the output spindle 124 is received through the bottom surface of the lower gear case cover 114*b*. The bearing 122 is then mounted on the output spindle 124 (e.g., by press-fitting or slip-fitting) with the spring member 130 in a preload condition. This process has been found to be slow and burdensome. In addition, since the force of the spring 130 is transferred to the bearing 122 during use, it has been found to adversely affect the press between the bearing 122 and the output spindle 124 and at times even cause displacement of the bearing 122 over time.

U.S. Pat. No. 9,399,278 is another example of a prior art wheel retention mechanism. In this configuration, a flange is mounted on the output spindle (either via threads or press-fitting) to support one end of the spring element. Thus, the force of the spring element is not transferred to the bearing. However, the transfer element is not self-supported on the output spindle and can only be mounted via a supporting flange.

The embodiment of the invention described herein overcomes the problems associated with the prior art configuration of FIG. 2, but also provides a wheel retention mechanism that is self-supported on the output spindle.

Figure 3:
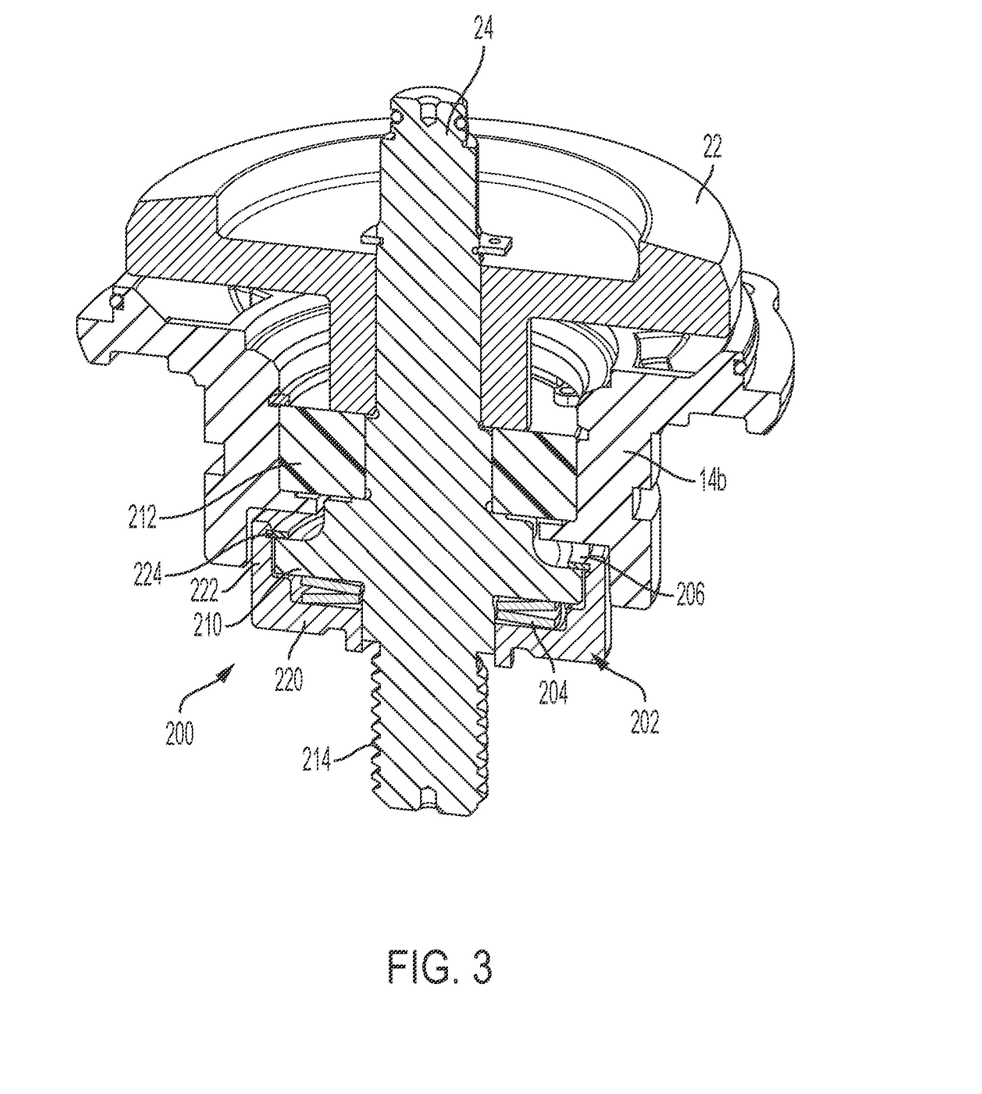
FIG. 3 depicts a perspective cross-sectional view of an improved wheel retention mechanism, according to an embodiment.

Referring to FIG. 3, wheel retention mechanism 200 includes a retention flange 202 and one or more spring elements 204. In an embodiment, retention flange 202 has a cup-shaped body that includes a main disc-shaped portion 220 having a center through-hole disposed around the output spindle 24 and a cylindrical wall 222 extending peripherally from the disc-shaped portion 220. Output spindle 24 includes an annular rim 210 below which the spring elements 204 and disc-shaped portion 220 of the retention flange 202 are disposed. Spring elements 204 are sandwiched between the annular rim 210 and the disc-shaped portion 220 of the retention flange 202. The spring members 204 are depicted in this example as a stack of Belleville discs, though it should be understood that a single Belleville disc, or an alternative form of spring such as a compression spring, may alternatively be utilized. A top portion of the cylindrical wall 222 of the retention flange 202 includes an annular recess 224 in its inner surface that receives a retaining ring 206. Retaining ring 206 sits above the annular rim 210 to axially limit the downward movement of the retention flange 202.

In an embodiment, annular rim 210 is provided at approximately the same plane as a bottom portion of the lower gear case cover 14*b* with a diameter that is greater than a diameter of the spring elements 204 and at least twice the diameter of the output spindle 24. A bearing 212 is provided above the annular rim 210 to axially secure the output spindle 24 to the lower gear case cover 14*b*. Gearset 22 is provided above the bearing 212 to rotationally drive the output spindle 24. A threaded portion 214 of the output spindle 24, to which a threaded wheel accessory or a threaded nut is fastened, is positioned below the lower surface of the retention flange 202.

Figure 4:
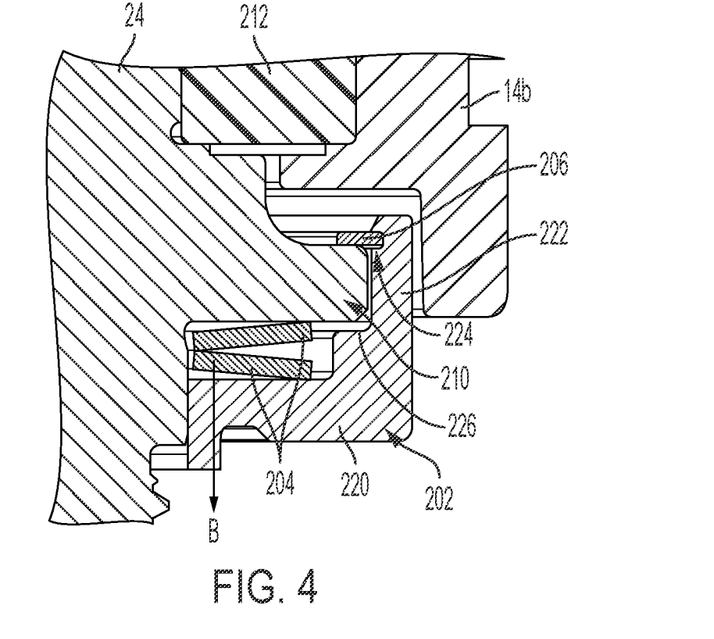
FIG. 4 depicts a partial side cross-sectional view of the wheel retention mechanism in an unmounted position, according to an embodiment.

FIG. 4 depicts a partial side cross-sectional view of the wheel retention mechanism in an unmounted position of the wheel accessory (i.e., where no accessory wheel is tightened on the threated portion 214 of the output spindle 24), according to an embodiment. In an embodiment, in the unmounted position, the spring members 204 exert a force in the direction B to the retention flange 202. The force of the spring members 204 in the direction B causes the disc-shaped portion 220 of the retention flange 202 to move away from the annular rim 210 of the output spindle 24, creating a small separation between the annular rim 210 and an annular shoulder 226 of the retention flange 202. This movement is limited by the retaining ring 206 as it meets a top portion of the annular rim 210.

Figure 5:
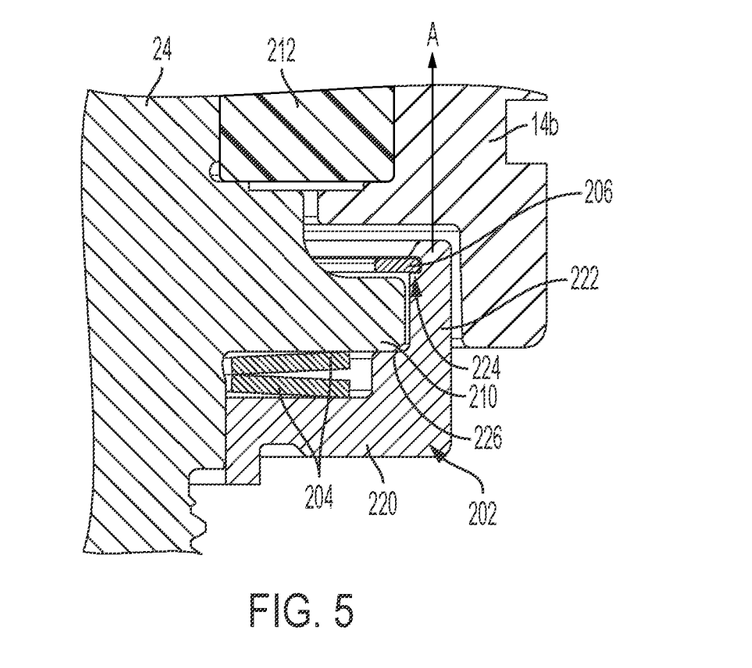
FIG. 5 depicts a partial side cross-sectional view of the wheel retention mechanism in a mounted position, according to an embodiment.

FIG. 5 depicts a partial side cross-sectional view of the wheel retention mechanism in a mounted position of the wheel accessory, according to an embodiment. In an embodiment, in the mounted position, after the accessory wheel (or an intermediary flange or spacer) comes into contact with the retention flange 202, the continued fastening of the accessory wheel or the nut on the threaded portion 214 of the output spindle 24 applies a force in the direction A to the retention flange 202. Once this force is greater than the force of the spring members 204 in direction B, the retention flange 202 is moved towards the annular rim 210 until the annular shoulder 226 of the retention flange 202 comes into contact with the annular rim 210. This causes a small separation between the upper portion of the annular rim 210 and the retaining ring 206. In this position, the spring members 204 continues to apply a downward force on the retention flange 202, which increases the traction between the accessory wheel and the retention flange 202 and improve the retention of the accessory wheel on the output spindle 24.

Figure 6:
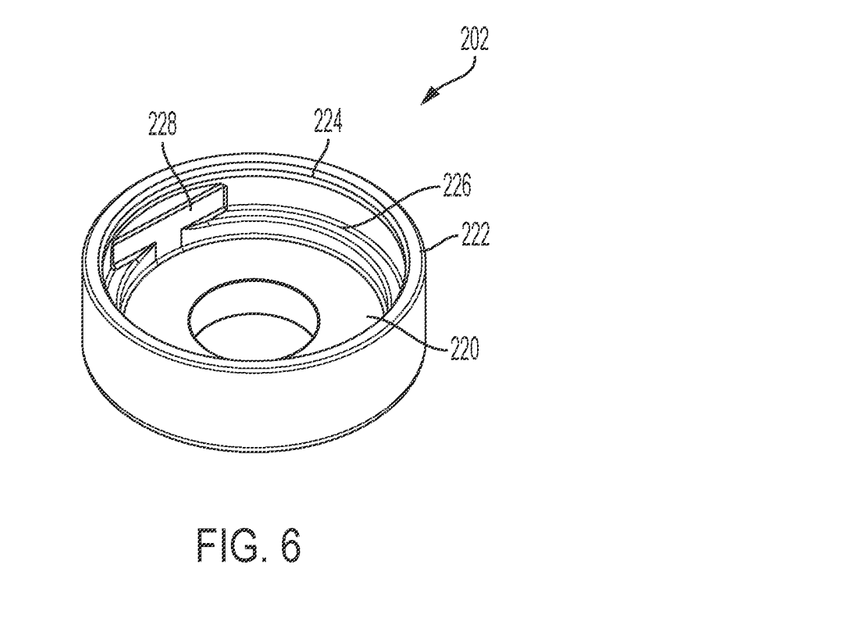
FIG. 6 depicts a perspective view of a retention flange, according to an embodiment.
Figure 7:
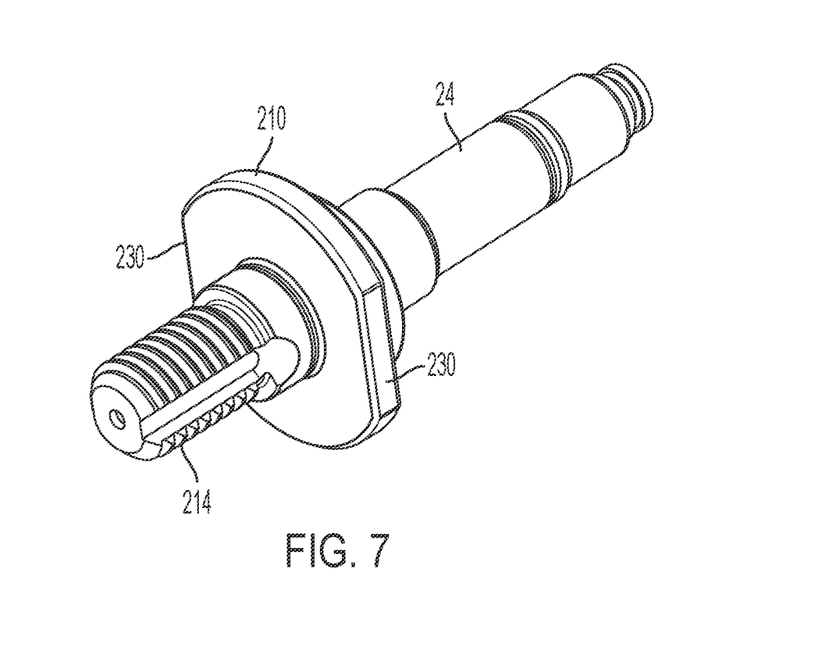
FIG. 7 depicts a perspective view of an output spindle, according to an embodiment.

FIG. 6 depicts a perspective view of the retention flange 202, according to an embodiment. FIG. 7 depicts a perspective view of the output spindle 24, according to an embodiment. As shown in these figures, retention flange 202 includes one or more flat walls 228 (in this example, two flat walls 228) provided on the inner surface of the cylindrical wall 222. The annular rim 210 of the output spindle 24 similarly includes one or more flat side portions 230 (in this example, two flat walls 228) arranged to engage the flat walls 228 of the retention flange 202. This ensures that the retention flange 202 is rotationally coupled to the output spindle 24.

Figure 8:
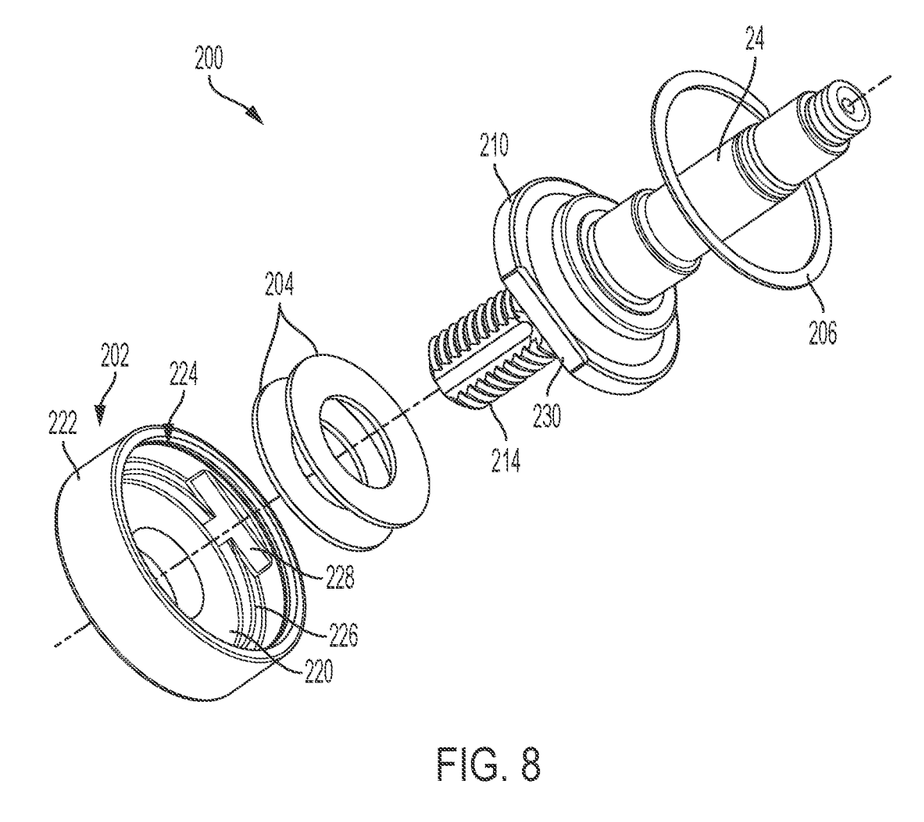
FIG. 8 depicts a perspective exploded view of the wheel retention mechanism, according to an embodiment.

FIG. 8 depicts a perspective exploded view of the wheel retention mechanism 200 described above, according to an embodiment. As seen here, and with continued reference to FIG. 3, a sub-assembly including the wheel retention mechanism 200 and the output spindle 24 may be assembled independently from the gear case 14. In an embodiment, to provide this sub-assembly, the retention flange 202 and the spring elements 204 are mounted on the annular rim 210 of the output spindle 24 and secured via the retaining ring 206. To mount the sub-assembly on the gear case 14, the output spindle 24 of the sub-assembly is received through a lower surface of the lower gear case cover 14*b* into the bearing 212. In an embodiment, gearset 22 is also press-fitted onto the output spindle 24.

Figure 9:
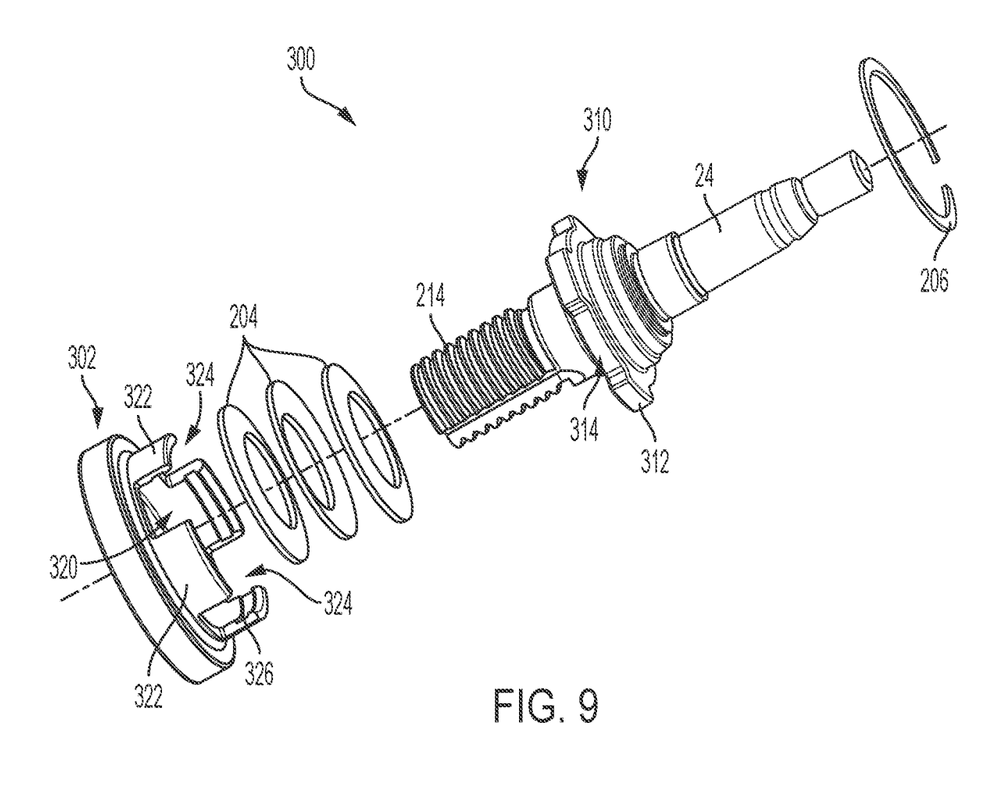
FIG. 9 depicts a perspective exploded view of an alternative embodiment of the wheel retention mechanism, according to an embodiment.

FIG. 9 depicts a perspective exploded view of a wheel retention mechanism 300, according to an alternative embodiment of the invention. In this embodiment, to the extent that the wheel retention mechanism 300 includes many of the same features described above, the same numeric references are provided. In an embodiment, output spindle 24 is provided with a modified annular rim 310 having a series of (in this example, four) radial projections 312 forming a series of recesses 314 therebetween. In an embodiment, a modified retention flange 302 is also provided including a cylindrical wall 322 that includes a series of (in this example, four) openings 324. The openings 324 are configured to receive the radial projections 312 of the annular rim 310, allowing the cylindrical wall 322 to be rotationally locked to annular rim 310. In an embodiment, spring elements 204 are sandwiched between the disc-shaped portion 320 of the retention flange 302 and the annular rim 310 of the output spindle 24. In an embodiment, retaining ring 206 is received within an annular recess 326 of the cylindrical wall 322 and sits above the annular rim 310 to limit the axial displacement of the retention flange 302 relative to the output spindle 24.

Both embodiments of the retention flange described above provide for a self-supporting wheel retention mechanism that can be manufactured and mounted on the output spindle as a sub-assembly prior to assembly of the output spindle into the gear case. Further, the spring force of the retention flange is transferred to the annular rim of the output spindle rather than the bearing, thus reducing wear and damage to the bearing over time.

Figure 10:
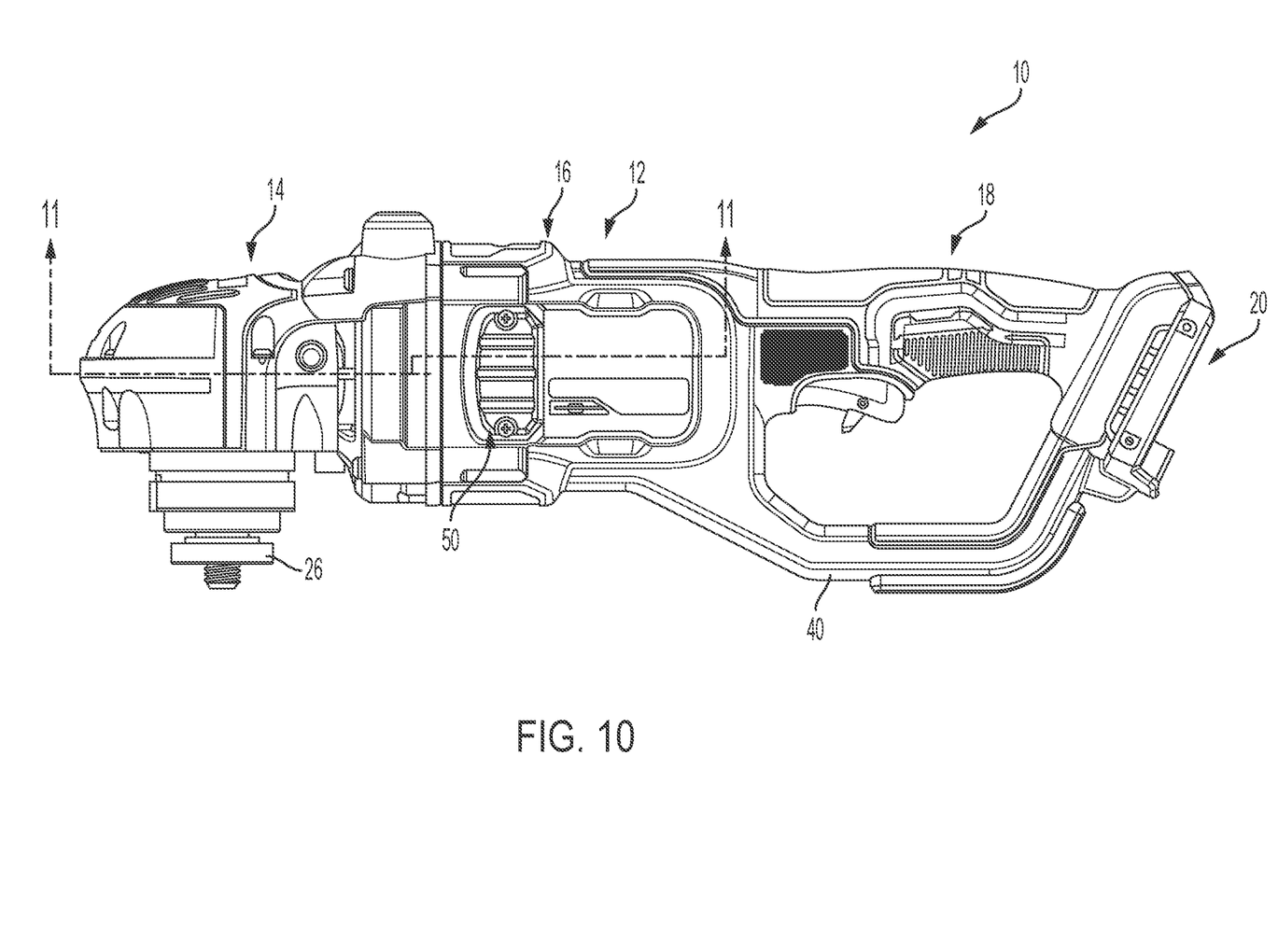
FIG. 10 depicts a side view of the power tool, according to an embodiment.
Figure 11:
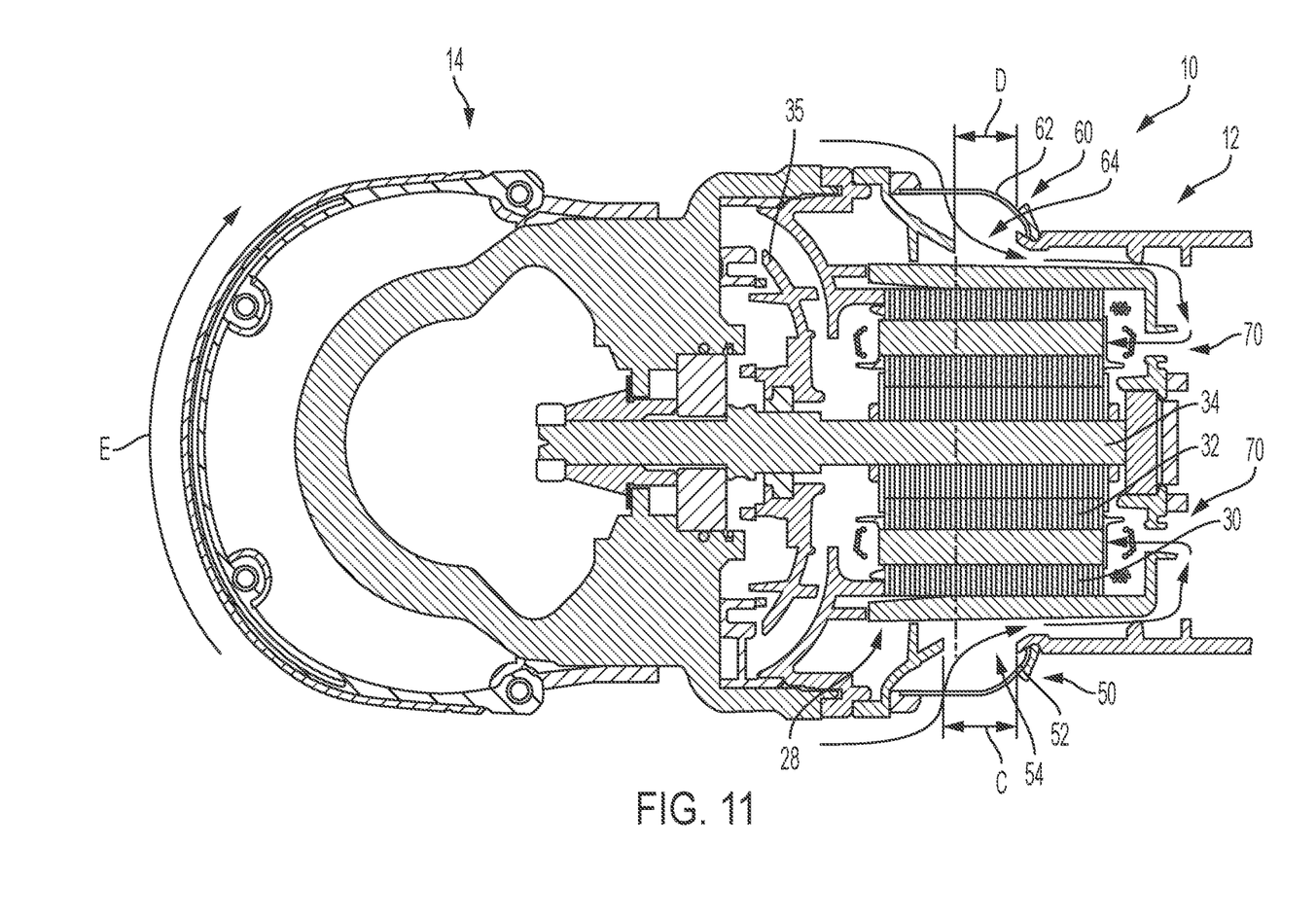
FIG. 11 depicts a top cross-sectional view of the power tool showing the side air intakes and air inlets, according to an embodiment.

Another aspect of the invention is described herein with reference to FIGS. 10 and 11.

FIG. 10 depicts a side view of the power tool 10 showing a left-side air intake 50, according to an embodiment. FIG. 11 depicts a top cross-sectional view of the power tool 10 along plane A shown in FIG. 10, according to an embodiment.

In an embodiment, the fan 35 rotates with the motor shaft 32 to generate an airflow through the motor 28 and other power tool components. The power tool housing 12 is provided with two side air intakes 50 and 60 positioned in the motor case 16 around the motor 28 for entry of ambient air. Air intake 50 and 60 are provided with screens (or a filters) 52 and 62 that blocks entry of dust and particulate through the air intakes 50 and 60. The filtered air then enters into the motor casing 16 through two air inlets 54 and 64 positioned radially inwardly of the air intakes 50 and 60. While screens 52 and 62 filter out majority of the debris and particulate, small amounts of debris can still get in through the screens 52 and 62. The filtered air travels along the outer sides of the motor 28 in a direction opposite the direction of the gear case 14, enters into the motor 28 through a series of openings 70 at the end of the motor 28, and travels through the stator 30 and/or the rotor 32 to cool the motor 28 components. The air then enters the gear case 24 or exists via the air exhaust vent 72 provided close to the gear case 24.

In an embodiment, wheel accessory (not shown) is rotates in a clockwise direction (direction E in FIG. 11) when viewing the power tool 10 from the top. This causes a higher concentration of grinding or cutting debris and particulate in the ambient air on the right side of the tool 10 than the left side when viewed from the top. According to an embodiment of the invention, to reduce exposure to the contaminated air and provide cleaner airflow in the power tool, right-side air inlet 64 is configured to be smaller than the left-side air inlet 54. In an embodiment, a width or diameter D of the right-side air inlet 64 is smaller than a width or diameter C of the left-side air inlet 54. In an embodiment, the width or diameter D of the right-side air inlet 64 is 80% to 90% of the width or diameter C of the left-side air inlet 54. The smaller right-side air inlet 64 allows a lower proportion of incoming air from the right side of the power tool 10 than the left side, thus reducing the total amount of contamination entering the motor 28.

In an embodiment, an area of the right-side air inlet 64 is in the range of 300 to 600 mm2, preferably in the range of 400 to 500 mm2, and an area of the left-side air inlet 54 is in the range of 500 to 800 mm2, preferably in the range of 600 to 700 mm2. In an embodiment, the area of the right-side air inlet 64 is approximately 60% to 90%, preferably 70% to 80%, preferably approximately 73% to 77%, of the area of the left-side air inlet 54.

This configuration provides for airflow through the right-side air inlet 64 in the range of approximately 10 to 16 cfm (cubic-feet per minute), preferably in the range of 12 to 14 cfm, and airflow through the left-side air inlet 54 in the range of 15-21 cfm, preferably in the range of 17-19 cfm. In an embodiment, the airflow through the right-side air inlet 64 is approximately 60% to 90%, preferably 65% to 80%, more preferably 70% to 75%, of the airflow through the left-side air inlet 54.

It should be understood that while in this example, the air inlets 54 and 64 are provided with different sizes, other components on the path of the airflow (e.g., the air intakes 50 and 60, the screens 52 and 62, the left and right air channels along the sides of the motor 28, etc.) may be similarly or alternatively provided with different sizes or shapes to provide a smaller airflow from the right-side air intakes 60 than the left-side air intakes 50. Similarly, the shape, thickness, or meshing of the screens 52 and 62 may be different to allow more airflow through the left-side screen 52 than the right-side screen 62.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
a housing including a motor case and a handle extending from the motor case;
an electric motor housed within the motor case and rotatably driving a motor spindle;
a gear case mounted on the housing;
an output spindle received at least partially within the gear case and rotatably coupled to the motor spindle, the output spindle and the motor spindle together forming a plane through the housing that intersects a top of the housing;
a fan rotatably fixed to the motor spindle to generate an airflow through the electric motor;
a first air inlet formed in the housing adjacent the electric motor on a first side of the plane, the first air inlet being located along an axial direction between an end of the motor and the gear case; and
a second air inlet formed in the housing adjacent the electric motor on a second side of the plane opposite the first air inlet, the second air inlet being located along the axial direction between the end of the motor and the gear case, wherein the first air inlet is larger than the second air inlet to allow a larger total volume of air to enter the housing and into the electric motor from the first side of the plane than from the second side of the plane.

2. The power tool of claim 1, wherein the output spindle rotates in a clockwise direction when viewed from a top of the gear case, and the first air inlet is located on the left side of the housing when viewed from the top of the gear case in a normal gripping position.

3. The power tool of claim 1, wherein the electric motor includes a stator and a rotor disposed within the stator, the first and second air inlets being positioned around the electric motor such that the air entering through the first and second air inlets traverses along the electric motor in a direction opposite the gear case and is thereafter directed into the electric motor in the direction of the gear case.

4. The power tool of claim 1, further comprising an exhaust vent positioned on the gear case through which the air is exhausted.

5. The power tool of claim 1, wherein the fan is positioned between the electric motor and the gear case.

6. The power tool of claim 1, wherein a width and/or diameter of the first air inlet is 80% to 90% greater than a width and/or diameter of the second air inlet.

7. The power tool of claim 1, wherein an area of the second air inlet is in the range of approximately 400 to 500 mm$^2$, and an area of the first air inlet is in the range of approximately of 600 to 700 mm$^2$.

8. The power tool of claim 1, wherein the air flows into the housing at an airflow volume of approximately 12 to 14 cubic-feet per minute through the second air inlet, and at an airflow volume of approximately 17 to 19 cubic-feet per minute through the first air inlet.

9. A power tool comprising:
a housing including a motor case and a handle extending from the motor case;
an electric motor housed within the motor case and rotatably driving a motor spindle;
a gear case mounted on the housing;
an output spindle received at least partially within the gear case and rotatably coupled to the motor spindle, wherein the output spindle, motor spindle, and the handle form a plane through the housing;
a fan rotatably fixed to the motor spindle to generate an airflow through the electric motor;
a first air inlet formed in the housing adjacent the electric motor and forward of a rear end of the electric motor on a first side of the plane; and
a second air inlet formed in the housing adjacent the electric motor and forward of the rear end of the electric motor on a second side of the plane opposite the first air inlet, wherein the first air inlet is larger than the second air inlet to allow a larger total volume of air to enter the housing and into the electric motor from the first side of the plane than from the second side of the plane.

10. The power tool of claim 9, wherein the output spindle rotates in a clockwise direction when viewed from a top of the gear case, and the first air inlet is located on the left side of the housing when viewed from the top of the gear case in a normal gripping position.

11. The power tool of claim 9, wherein the electric motor includes a stator and a rotor disposed within the stator, the first and second air inlets being positioned around the electric motor such that the air entering through the first and second air inlets traverses along the electric motor in a direction opposite the gear case and is thereafter directed into the electric motor in the direction of the gear case.

12. The power tool of claim 11, further comprising an exhaust vent positioned on the gear case through which the air is exhausted.

13. The power tool of claim 9, wherein the fan is positioned between the electric motor and the gear case.

14. The power tool of claim 9, wherein a width and/or diameter of the first air inlet is 80% to 90% greater than a width and/or diameter of the second air inlet.

15. The power tool of claim 9, wherein an area of the second air inlet is in the range of approximately 400 to 500 mm$^2$, and an area of the first air inlet is in the range of approximately of 600 to 700 mm$^2$.

16. The power tool of claim 9, wherein the air flows into the housing at an airflow volume of approximately 12 to 14 cubic-feet per minute through the second air inlet, and at an airflow volume of approximately 17 to 19 cubic-feet per minute through the first air inlet.

17. The power tool of claim 1, further comprising a first air channel in fluid communication with the first air inlet extending between the housing and an outer surface of the motor within the first side of the plane, and a second air channel in fluid communication with the second air inlet extending between the housing and the outer surface of the motor within the second side of the plane.

18. The power tool of claim 17, wherein the airflow passes through the first air channel and the second air channel in in a direction opposite the gear case and is thereafter directed into the electric motor in the direction of the gear case.

19. The power tool of claim 9, further comprising a first air channel in fluid communication with the first air inlet extending between the housing and an outer surface of the motor within the first side of the plane, and a second air channel in fluid communication with the second air inlet extending between the housing and the outer surface of the motor within the second side of the plane.

20. The power tool of claim 19, wherein the airflow passes through the first air channel and the second air channel in in a direction opposite the gear case and is thereafter directed into the electric motor in the direction of the gear case.

* * * * *